G. Palmer.
Horse Rake.

N° 50269        Patented Oct. 3, 1865.

Witnesses        Inventor
J. B. Woodruff        George Palmer
E. R. Moorsor

UNITED STATES PATENT OFFICE.

GEORGE PALMER, OF LITTLESTOWN, PENNSYLVANIA.

IMPROVEMENT IN HORSE-RAKES.

Specification forming part of Letters Patent No. 50,269, dated October 3, 1865.

*To all whom it may concern:*

Be it known that I, GEORGE PALMER, of Littlestown, in the county of Adams, in the State of Pennsylvania, have invented certain new and useful Improvements in Horse-Rakes; and the following is a full, clear, and exact description of the same, reference being had to the accompanying drawings, making a part of this specification, in which—

Figure 1:
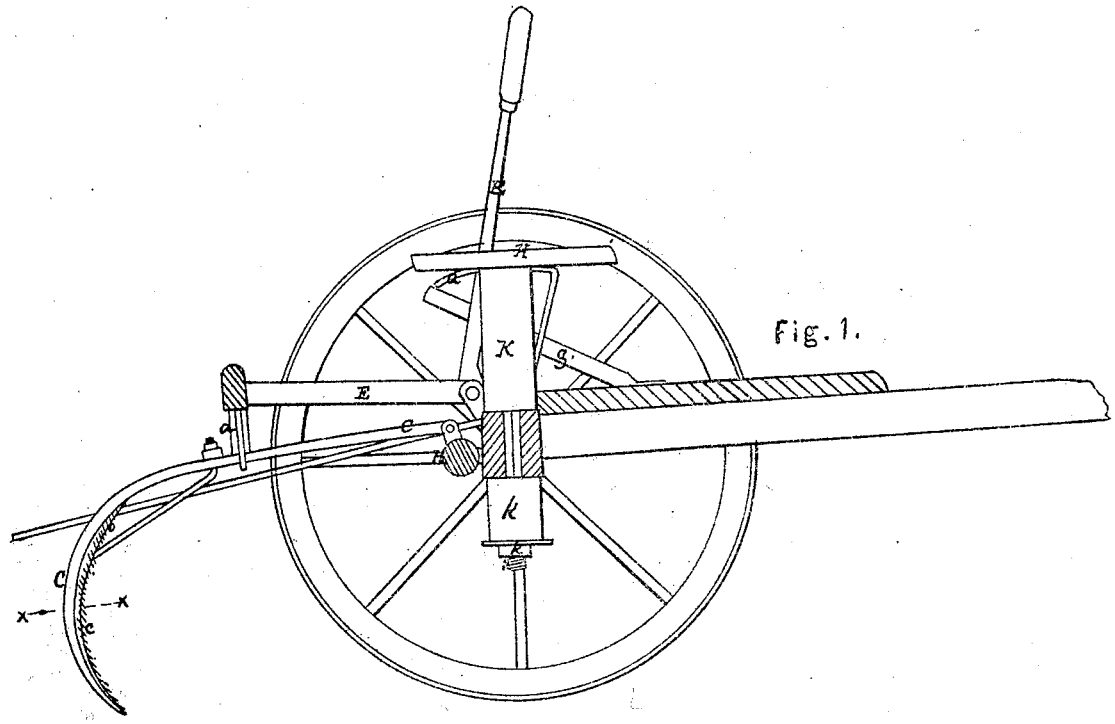
Figure 2:
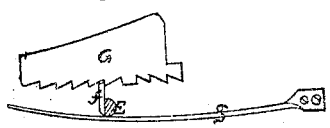
Figure 3:
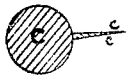

Figure 1 represents a side elevation of the buggy horse-rake, showing a section through the spring-seat for the driver, the hand-lever to operate the peculiarly-constructed sickle-edged yielding-hooked rake-teeth. Fig. 2 shows a detached view of the right and left ratchet-lever and spring for holding the rake-teeth in any desired position for use or going to and from the field. Fig. 3 shows a section through the sickle-edged rake-tooth at the curve $xx$.

The object of my invention is to hook up, cut, and carry off all of the tangled clover, grass, or grain that is not cut by the mower or reaper.

My invention consists in having sharp sickle cutting-edges in the front side of hooked rake-teeth.

My invention further consists in the construction, arrangement, and application of vulcanized india-rubber for a spring to the driver's seat, so that it is adjustable to the weight of the driver, and will not bound to throw him off the seat.

To enable others skilled in the art to make and use my improved buggy horse-rake, I will describe it more fully, referring to the drawings and to the letters marked thereon.

To the rear side of the axle A, on which are placed a common pair of light wheels, I attach a bar, B, to which I hinge any desired number of hooked metallic rake-teeth, C C, they being made and provided with sharp sickle-edges $c\ c$, so that they will cut clear any running vines or briers or the tangled clover, grass, or grain that lies below the cutting-edge of a mower or reaper, and thus enable the ground to be cleared of much that remains on the field when having been gone over with any of the best-constructed horse-rakes known or in use.

The teeth or hooked sickles C are each held in their proper position by guides $b\ b$, placed in a bar, D, the guides $b$ being formed of bent rods or staples, between which are secured blocks of vulcanized rubber, which will yield sufficiently to allow the teeth C to conform to any ordinary irregularity of the ground it would be required to pass over.

The timber or bar D is supported on the arms E of a rock-shaft, $e$, to which the hand-lever F is attached, for the purpose of elevating and depressing the teeth C to liberate the contents gathered by the rake.

On the lever F is a catch, $f$, to operate in a ratchet, G, to hold the bar D and the sickle-edged rake-teeth C in any desired position, the catch $f$ being held at rest by the spring $g$.

The driver's seat H is placed upon a single standard or post, I, which passes through a hole or mortise in the center of the axle A. Around the post I are sections of vulcanized india-rubber pipe or tube, K K, both above and below the axle A, and on the lower end of the standard I is fitted a screw, $i$, it having a thumb-nut, $h$, by which more or less pressure can be brought to bear on the rubber tubes K K, to prevent the seat from bounding and the spring of the seat regulated to suit the weight of the driver.

It will readily be seen that by my improvements much can be gathered from both the harvest and hay fields which is now lost, as the sickle-edge cutting rake-teeth not only perform the same and as much as any other rake, but they also perform a new function—that of cutting as well as gathering up fallen grain and tangled and lodged clover or grass of any kind.

Having thus fully described my invention, what I claim as new, and desire to secure by Letters Patent, is—

1. The sharp-cutting sickle-edge rake-teeth, the same being constructed, arranged, and operated in the manner as and for the purposes herein specified.

2. The application of vulcanized india-rubber tube for the support of the driver's seat, in combination with the mode of adjusting the same, as herein described.

GEORGE PALMER.

Witnesses:
J. B. WOODRUFF,
E. R. MORRISON.